(12) United States Patent
Dodds et al.

(10) Patent No.: US 11,712,713 B2
(45) Date of Patent: Aug. 1, 2023

(54) METHOD OF SLOT DIE COATING OVER DEFORMABLE BACK-UP ROLL

(71) Applicant: 3M INNOVATIVE PROPERTIES COMPANY, St. Paul, MN (US)

(72) Inventors: Shawn C. Dodds, St. Paul, MN (US); Tyler J. Rattray, Minneapolis, MN (US); Kara A. Meyers, Oakdale, MN (US); Mikhail L. Pekurovsky, Bloomington, MN (US); Scott L. Ciliske, St. Paul, MN (US); James N. Dobbs, Woodbury, MN (US); Samad Javid, Woodbury, MN (US)

( * ) Notice: Subject to any disclaimer, the term of this patent is extended or adjusted under 35 U.S.C. 154(b) by 0 days.

(21) Appl. No.: 17/309,602

(22) PCT Filed: Dec. 3, 2019

(86) PCT No.: PCT/IB2019/060411
§ 371 (c)(1),
(2) Date: Jun. 9, 2021

(87) PCT Pub. No.: WO2020/121121
PCT Pub. Date: Jun. 18, 2020

(65) Prior Publication Data
US 2022/0016670 A1    Jan. 20, 2022

Related U.S. Application Data

(60) Provisional application No. 62/779,138, filed on Dec. 13, 2018.

(51) Int. Cl.
*B05D 1/26* (2006.01)
*B05C 5/02* (2006.01)
(Continued)

(52) U.S. Cl.
CPC ............ *B05D 1/265* (2013.01); *B05C 5/0254* (2013.01); *B05C 1/083* (2013.01); *B05C 5/027* (2013.01); *B05C 5/0258* (2013.01); *B29C 48/35* (2019.02)

(58) Field of Classification Search
CPC ..... B05D 1/265; B05C 5/0254; B05C 5/0258; B05C 5/027; B05C 1/083; B05C 1/12; B05C 1/0808; B29C 48/35
(Continued)

(56) References Cited

U.S. PATENT DOCUMENTS 4,889,072 A * 12/1989 Krimsky ............... B05C 5/0254
                                                            118/259
4,943,451 A *  7/1990 Zimmer .................... B05C 9/04
                                                            427/244

(Continued)

FOREIGN PATENT DOCUMENTS

DE      10 2011 110 281 A1    12/2021
GB                736747        9/1955
WO        WO 2016/200866    * 12/2016  ............... B05C 1/08

OTHER PUBLICATIONS

Gates, "Slot Coating Flows: Feasibility, Quality—vol. I", University of Minnesota Microform No. 9946975, 1999, pp. 1-595.

(Continued)

*Primary Examiner* — Brian K Talbot
(74) *Attorney, Agent, or Firm* — Thomas M. Spielbauer

(57) ABSTRACT

Methods and apparatuses for applying coatings (9) on a moving web (3) are provided. A slot die (20) and a back-up roll (11) engage with each other. The back-up roll has a deformable inner layer (12) with a surface thereof covered by a deformable outer layer (14). The slot die and the flexible web at a contacting area are impressed into the back-up roll with an engagement depth D, which enables (Continued)

formation of a coating having a substantially uniform thickness.

11 Claims, 6 Drawing Sheets

(51) Int. Cl.
 *B29C 48/35* (2019.01)
 *B05C 1/08* (2006.01)
(58) Field of Classification Search
 USPC .......................................................... 427/356
 See application file for complete search history.

(56) References Cited

U.S. PATENT DOCUMENTS

| | | | |
|---|---|---|---|
| 5,206,992 A | 5/1993 | Carlson | |
| 5,728,430 A * | 3/1998 | Sartor | B05C 5/0254 |
| | | | 118/411 |
| 6,079,352 A | 6/2000 | Principe | |
| 6,178,657 B1 | 1/2001 | Graff | |
| 6,503,620 B1 * | 1/2003 | Xie | B32B 7/06 |
| | | | 428/323 |
| 6,592,701 B1 * | 7/2003 | Bonnebat | B05C 1/0834 |
| | | | 427/428.15 |
| 6,627,262 B1 * | 9/2003 | Soas | B05D 1/28 |
| | | | 118/259 |
| 7,846,504 B2 | 12/2010 | Maier | |
| 8,714,103 B2 * | 5/2014 | Nishio | B05C 5/0283 |
| | | | 118/316 |
| 9,265,672 B2 * | 2/2016 | Brown | A61F 13/15593 |
| 2002/0108563 A1 * | 8/2002 | Yoshida | B05C 1/12 |
| | | | 118/244 |
| 2004/0247794 A1 * | 12/2004 | Tokimasa | G03C 1/74 |
| | | | 118/123 |
| 2014/0120258 A1 * | 5/2014 | Anderson | B05C 11/1042 |
| | | | 118/325 |
| 2014/0148774 A1 | 5/2014 | Brown | |
| 2014/0234584 A1 * | 8/2014 | Hyde | C09D 153/02 |
| | | | 428/152 |

OTHER PUBLICATIONS

Good, "Modeling Rubber Covered Nip Rollers in Web Lines", Proceedings of the Sixth International Conference on Web Handling, Oklahoma State University, Stillwater, 2001, pp. 159-186.
Johnson, "Contact Mechanics", Cambridge University Press, Library of Congress Catalog: 84-11346, 1985, 8 pages.
Nam, "Analysis of Tensioned-Web-Over-Slot Die Coating", University of Minnesota No. 3389349, 2009, pp. 1-374.
International Search Report for PCT International Application No. PCT/IB2019/060411, dated Mar. 18, 2020, 5 pages.

* cited by examiner

METHOD OF SLOT DIE COATING OVER DEFORMABLE BACK-UP ROLL

CROSS REFERENCE TO RELATED APPLICATIONS

This application is a national stage filing under 35 U.S.C. 371 of PCT/IB2019/060411, filed Dec. 3, 2019, which claims the benefit of U.S. Application No. 62/779,138, filed Dec. 13, 2018, the disclosure of which is incorporated by reference in its/their entirety herein.

BACKGROUND

There are two typical types of die coating configurations for applying coating material on a moving web: coating against a back-up roll or coating on a tensioned web in a free span. Slot dies have been widely used as a coating device for applying coating on a web. FIG. 1' illustrates a slot die 2' for disposing a liquid material 7' on a free span 3' of a flexible web to form a coating 9'.

SUMMARY

There is a desire to improve coating uniformity when applying a coating on a moving web via a slot die. For example, in the process shown in FIG. 1', the free span 3' of a baggy web may not maintain uniform tension across the width of the slot die 2', leading to variations in coat weight/thickness across the baggy web. The present disclosure provides methods and apparatuses of applying a uniform coating on a web via a slot die over a deformable back-up roll.

Briefly, in one aspect, the disclosure describes a method of applying a coating onto a web. The method includes providing a back-up roll having a deformable inner layer with a surface thereof covered by a deformable outer layer, the inner layer being softer than the outer layer; providing a slot die having one or more die lips extending along a cross direction, the die lips being positioned proximate to the back-up roll; disposing a flexible web between the back-up roll and the die lips; and dispensing a liquid coating material from the slot die onto the flexible web. The flexible web at a contacting area is impressed into the back-up roll with an engagement depth D.

In another aspect, this disclosure describes a coating apparatus including a back-up roll having a deformable inner layer with a surface thereof covered by a deformable outer layer, the inner layer being softer than the outer layer; a slot die having one or more die lips extending along a cross direction, the die lips being positioned proximate to the back-up roll; and a flexible web disposed between the back-up roll and the slot die. The flexible web at a contacting area is impressed into the back-up roll with an engagement depth D, and the slot die is configured to dispense a liquid coating material onto the web. In some embodiments, the deformable inner layer of the back-up roll has a hardness less than 20 Shore A, optionally less than 10 Shore A. The deformable outer layer of the back-up roll has a hardness greater than about 40 Shore A, optionally greater than about 50 Shore A.

Various unexpected results and advantages are obtained in exemplary embodiments of the disclosure. One such advantage of exemplary embodiments of the present disclosure is that a substantially uniform coating can be formed on a moving web via a slot die over a deformable back-up roll. This can be achieved by engaging a slot die with a deformable back-up roll having a deformable outer layer and a deformable inner layer, where a flexible web and the deformable outer layer at a contacting area can be impressed into the deformable inner layer with a certain engagement depth. The embodiments described herein can significantly mitigate undesired effects when coating a moving web. For example, coating on a free-span of a baggy web may result in variations in coat weight across the web, while coating against a rigid back-up roll, may create issues related to back-up roll nonuniformity and have limitations in coating thin layers of liquid on a web.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying drawings, in which:

FIG. 1 is a perspective view of a coating apparatus applying coating on a moving web, according to one embodiment.

FIG. 2A' is an enlarged portion view of a coating apparatus including a rigid back-up roll.

Figure 1:
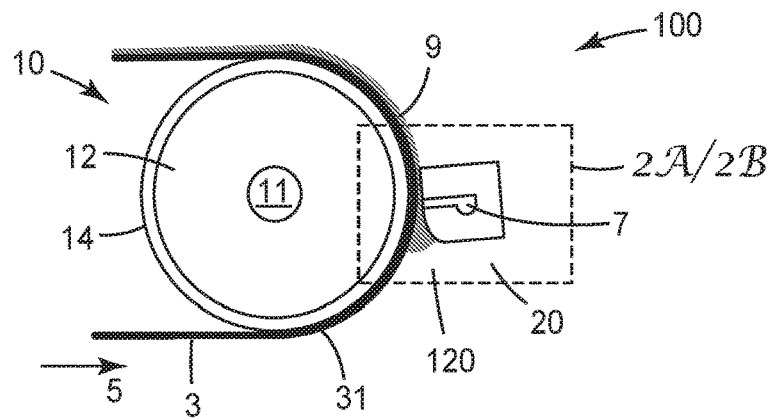
FIG. 1' illustrates a perspective view of a slot die coating on a free-span web (prior art).

In the drawings, like reference numerals indicate like elements. While the above-identified drawings, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

In this application, the terms "compressible" or "incompressible" refers to a material property, i.e., compressibility, of an object (e.g., an elastomer outer layer) which is a measure of the relative volume change of the material in response to a pressure. For example, the term "substantially incompressible" refers to a material having a Poisson's ratio greater than about 0.45.

The term "elastically deformable" means a deformed object (e.g., an inner layer of synthetic foam) being capable of substantially 100% (e.g., 99% or more, 99.5% or more, or 99.9% or more) recovering to its original, undeformed state.

The term "baggy web" refers to a web that shows non-planarity or distortions, at least in a portion of the surface of the web, when positioned on a flat surface. The web bagginess, which may be caused by differential tensions across the width of the web during the web manufacturing, can result in cross-web direction (CD) length variation. U.S. Pat. No. 6,178,657 describes a method and apparatus to measure the internal web length differences in the CD of sheet materials. In this application, the CD length variation of a baggy web can be equivalent to or smaller than, for example, 10,000 ppm (equivalent to 1% strain), or 1,000 ppm (equivalent to 0.1% strain).

The term "slot die" or "slot die coating" refers to a system or a method of dispensing a liquid coating material from a die body thereof to a web. The die coating described herein is a pre-metered coating process in which the amount of liquid applied to the web per unit area is substantially predetermined by a fluid metering device upstream, such as, for example, a precision gear pump. Typical slot die coating methods and systems are described in, e.g., Ian D. Gates, Slot Coating Flows: Feasibility, Quality, PhD Thesis, 1999, University of Minnesota.

The terms "liquid," "liquid material," or "liquid coating material" refers to any materials flowable at coating operation conditions described herein.

In this application, the terms "polymer" or "polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

In this application, by using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate (e.g., web). However, unless otherwise indicated, it is not intended that the substrate (e.g., web) or articles should have any particular orientation in space during or after manufacture.

In this application, by using the term "overcoated" to describe the position of a layer with respect to a substrate (e.g., web) or other element of an article of the present disclosure, we refer to the layer as being atop the substrate (e.g., web) or other element, but not necessarily contiguous to either the substrate (e.g., web) or the other element.

In this application, the term "machine direction" refers to the direction in which the web travels. Similarly, the term cross-web refers to the direction perpendicular to the machine direction (i.e. perpendicular to the direction of travel for the web), and in the plane of the top surface of the web.

In this application, the terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

In this application, the term "substantially" with reference to a property or characteristic means that the property or characteristic is exhibited to a greater extent than the opposite of that property or characteristic is exhibited. For example, a substrate (e.g., web) that is "substantially" transparent refers to a substrate (e.g., web) that transmits more radiation (e.g. visible light) than it fails to transmit (e.g. absorbs and reflects). Thus, a substrate (e.g., web) that transmits more than 50% of the visible light incident upon its surface is substantially transparent, but a substrate (e.g., web) that transmits 50% or less of the visible light incident upon its surface is not substantially transparent.

In this application, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this application, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the specification and more particularly the Listing of Exemplary Embodiments and the claims can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but are to be controlled by the limitations set forth in the claims and any equivalents thereof.

Methods and apparatuses are described herein for slot die coating on a moving substrate. In a coating process described herein, a flexible web is disposed between a back-up roll and a slot die. The back-up roll has a deformable inner layer with a surface thereof covered by a deformable outer layer. The inner layer may be softer than the outer layer. The flexible web can be a baggy web that wraps around the back-up roll.

The slot die and the back-up roll can be pressed against each other with an engagement depth D. A liquid coating material can be dispensed from the slot die onto the flexible web to form a liquid layer (coating bead) between a coating surface of the slot die and the flexible web. The coating bead described herein refers to a volume of liquid contained between a substrate and a coating die. It is to be understood that the pressure in the coating bead can further impress the flexible web and the deformable outer layer into the deformable inner layer.

In some embodiments, the engagement depth D can be adjusted to enable a uniform coating on a web. In some embodiments, a positioning mechanism can be provided to control the distance between the slot die and the back-up roll so as to adjust the engagement depth D. This positioning mechanism may adjust the engagement depth D by moving the slot die relative to a fixed backup roll, moving the backup roll relative to a fixed slot die, or by moving both the backup roll and the slot die simultaneously. The pressure in the coating liquid may be altered as the engagement depth D is changed. In some embodiments, the engagement width W may correspond to the width of the coating surface of the slot die, which may be substantially a constant during coating.

The uniformity of a liquid coating may be impacted by a combination of many sources of imperfections and may result in variations in the appearance and amount of the coating that adheres to a substrate. The present disclosure addresses some issues that might impact the coating uniformity. In some embodiments, the average amount of the applied liquid coating can be metered by a solution handling system, which can be proportioned to the speed and width of the flexible web that is to be coated. The thickness variation in the cross-web direction of the applied liquid coating can be controlled by the performance of the die cavity, which shapes flow from a feed pipe into a sheet that emerges from a die slot. The thickness uniformity in the cross-web direction is referred to as the coating profile. In some embodiments, the thickness uniformity in the down-web direction can be controlled by solution handling (e.g., to control a down-web coating thickness variation due to the variation in the flowrate delivered by a pumping system) and web handling (e.g., to control a down-web coating thickness variation due to variation in the speed of a substrate). In the present disclosure, the coating profile can be controlled such that both the cross-web coating thickness and the down web coating thickness are substantially uniform over time.

In some cases, factors other than the performance of the solution handling, the die cavity and/or the web handling, may also affect the uniformity of the coating profile. For example, nonuniformities in the coating bead may create visible localized defects in the applied coating such as those brought on by entrainment of air between the coating and the web, break-up of the continuous coating bead into rivulets or repeating cross web bands, and surface roughness in the coated surface. These discontinuities and nonuniformities in the coating are generally referred to as coating defects.

In addition, coating defects may be produced by imperfections in a back-up roll. For example, when a back-up roll is used, it may deviate significantly from an ideal cylinder, as indicated by a total indicated runout (TIR). The requirement for a low TIR (e.g., less than 1 micrometer) back up roll can significantly increase the cost and complexity of a slot die coating system with a back-up roll. When a liquid coating is applied in free-span such as shown in FIG. 1', baggy lanes in the substrate may also lead to coating defects as the web bag can lead to an imbalance between the pressure produced by the web and that produced by the coating bead.

Figure 2A:
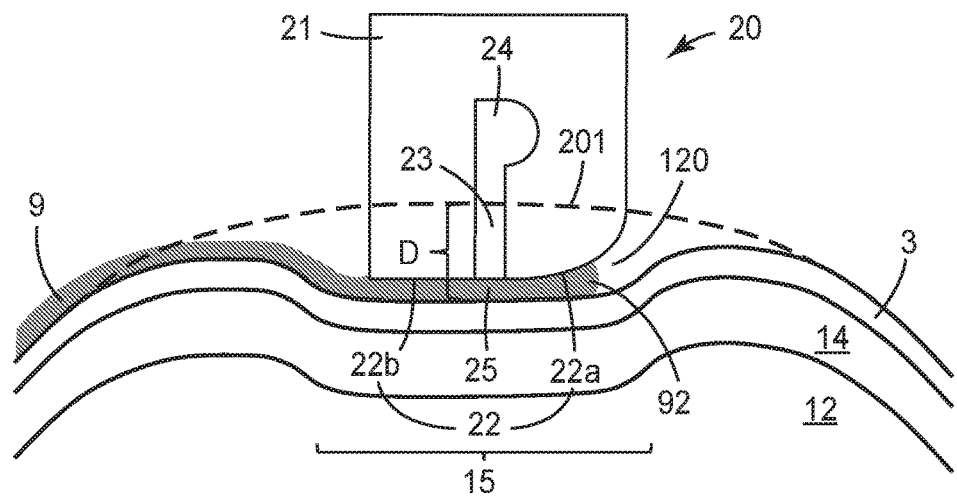
FIG. 2A is an enlarged portion view of FIG. 1, according to one embodiment.
Figure 2A:
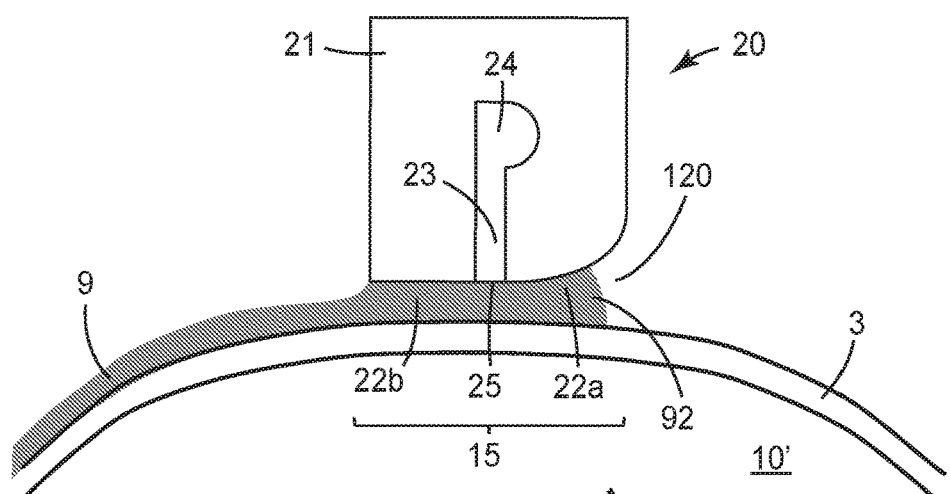
Figure 1:
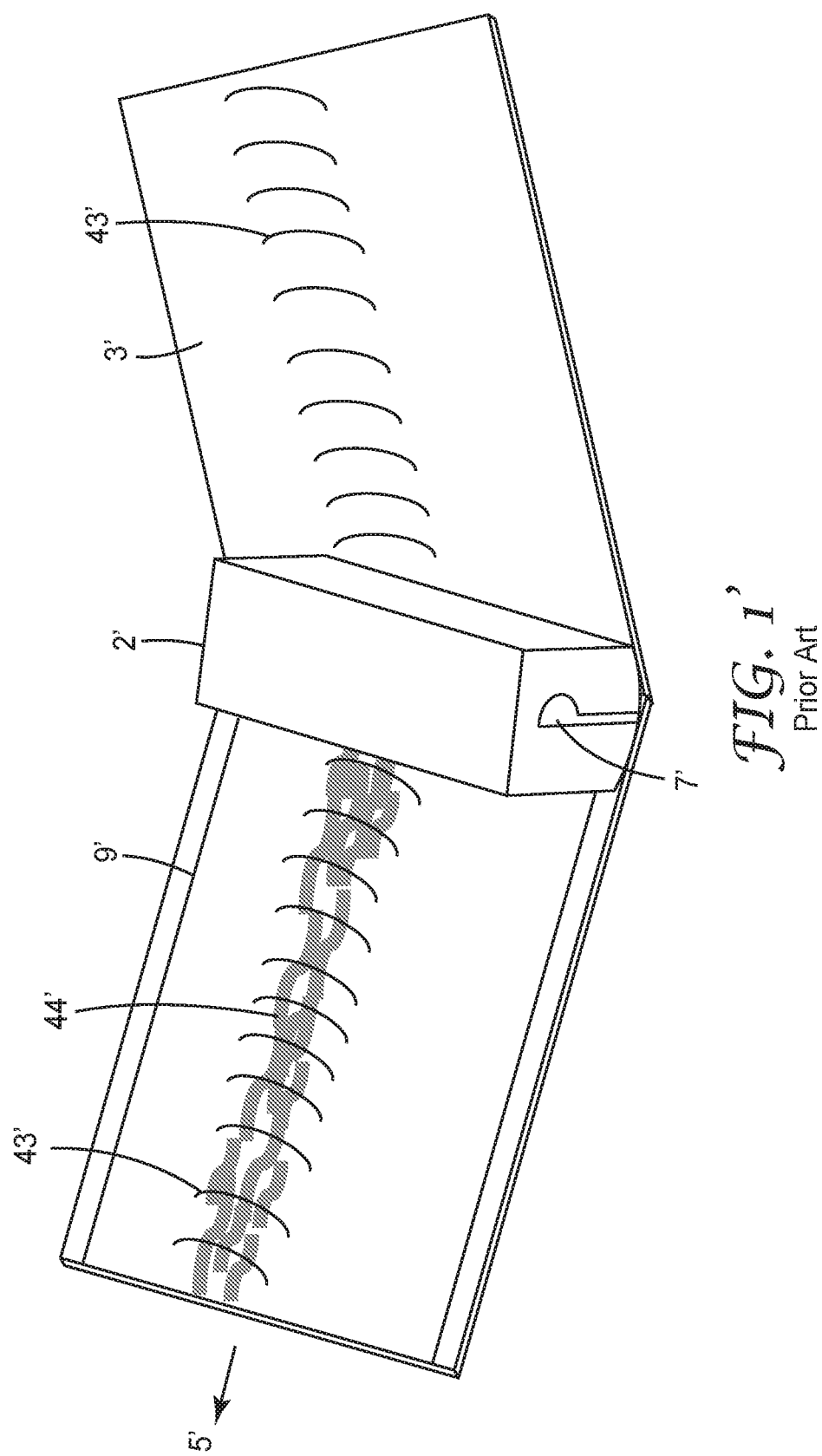

In some cases, producing coatings with a wet thickness of about 50 micrometers or less can be challenging when using a slot die. To produce such a thin coating against a rigid back-up roll such as shown in FIG. 2A', the slot die 2 may be positioned at a very close proximity to the rigid back-up roll 10' (e.g., less than 100 micrometers), and therefore requires increasing precision not just in the positioning system, but also in the uniformity of the die and roll surfaces, and this quickly becomes impractical. A free-span coating does not have this challenge since there is no back-up roll, and so in theory one may be able to position the web arbitrarily closely to the slot die, and so produce arbitrarily thin coatings. In practice, a free-span coating may require increasingly accurate control of the tension and thickness in the substrate upon which the coating is applied, as these parameters can lead to changes in the pressure in the coating bead, and therefore variations in the local thickness of the coating.

Methods and apparatuses are described herein for slot die coating which can address the above described issues. In some embodiments of the present disclosure, a deformable back-up roll can be used, which allows the web to lay against the deformable back-up roll, diminishing the impact of web bag as compared to free-span coating, while also allowing the back-up roll to deflect under the fluid pressure in the coating bead, diminishing the impact of any surface non-uniformities in the back-up roll as compared to coating against a rigid back-up roll.

Some embodiments of the present disclosure can further address variation of coating thickness due to a splice. When changing from a first input roll of substrate to a second input roll of substrate, it is common to tape the trailing end of the first input roll of substrate to the leading edge of the second input roll of substrate, producing what is commonly referred to as a splice. In practice, this produces a significant thickness variation in the substrate at the location of the splice, due to the thickness of any tape used to hold the two substrates together, as well as due to any overlap between the two layers of substrate. When coating with a slot die against a rigid back-up roll, this may force the coating practitioner to temporarily increase the gap between the slot die and the rigid back-up roll so that the splice does not get stuck at the slot die, which typically may result in the web breaking and would therefore lead to a significant interruption in the coating operation. This may not typically be a problem when coating in free span, since there is no back-up roll to trap the splice. In the present disclosure, a rigid back-up roll is replaced with a soft, deformable back-up roll, and the splice can pass through the gap between the die and the back-up roll without tearing the splice due to deformation of the roll, resulting in a less significant interruption to the coating operation.

Figure 2B:
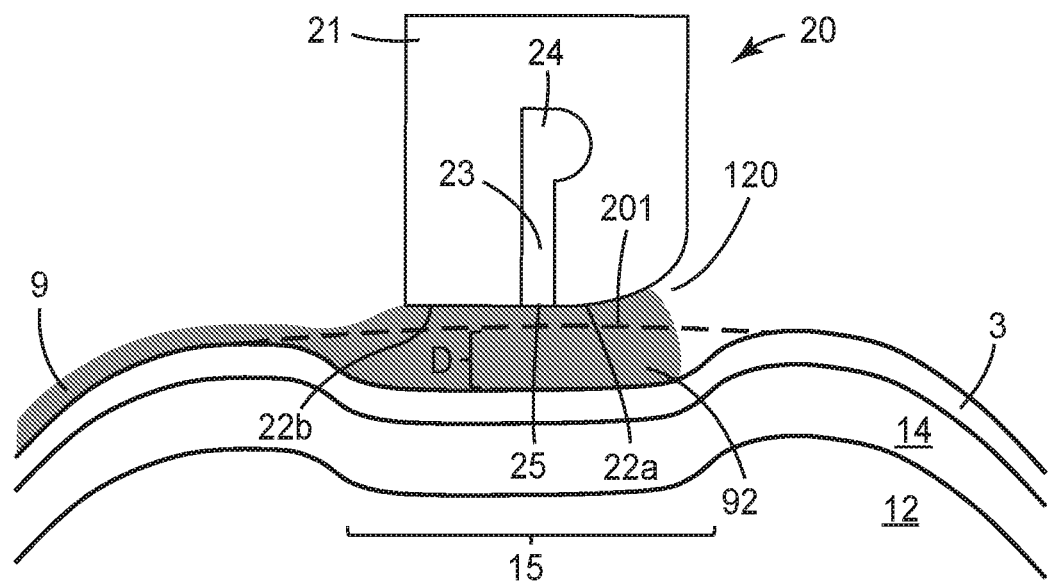
FIG. 2B is an enlarged portion view of FIG. 1, according to another embodiment.

Various exemplary embodiments of the disclosure will now be described with particular reference to the Drawings. Referring now to FIG. 1, a perspective view of a coating apparatus 100 for applying a liquid coating on a moving web via a slot die over a back-up roll, according to some embodiments. FIGS. 2A and 2B illustrate an enlarged portion view of the coating apparatus 100 in FIG. 1, according to some embodiments.

The coating apparatus 100 includes a back-up roll 10 and a slot die 20. The slot die 20 has a die lip 22 that engages with the back-up roll 10 to form a coating zone 120. In the depicted embodiment, the die lip 22 includes an upstream lip 22a and a downstream lip 22b which provide an upstream coating surface at 22a and a downstream coating surface at 22b, respectively. A flexible web 3 of indefinite length material is conveyed in a machine direction 5 into the coating zone 120. It is to be understood that the web may not be limited to the specific wrap angles as it enters/exits the coating zone shown schematically in FIG. 1. Also, the vertical position of the slot die 20 compared to the back-up roll 10 may not be limited to what is depicted in FIG. 1.

Figure 2C:
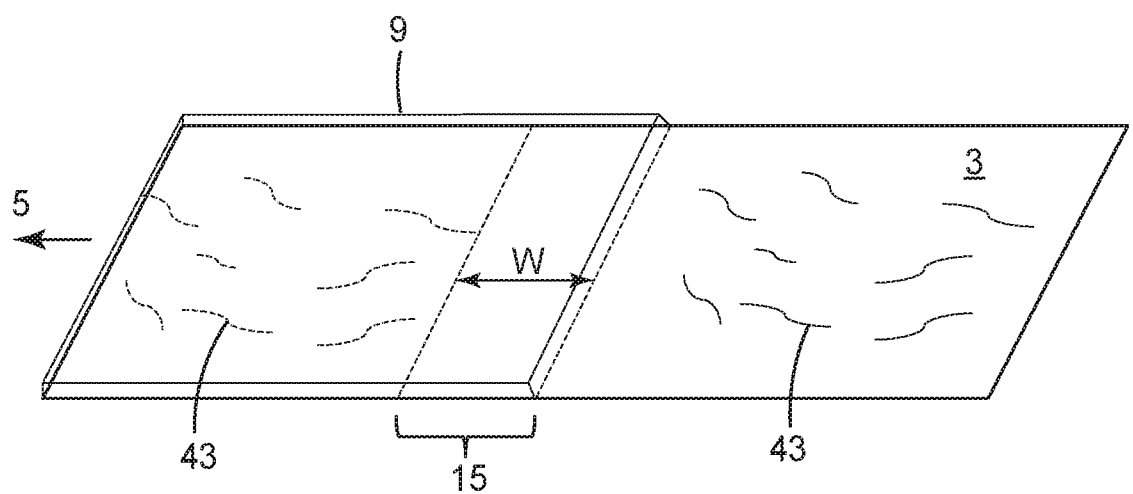
FIG. 2C is a perspective view of the web of FIG. 2A.

The slot die 20 includes a die body 21 defining an internal manifold 24. The die lip 22 of the slot die 20 has an opening 25 in fluid communication with the internal manifold 24 via a slot channel 23. The die lip 22 is positioned proximate to the back-up roll 10 and extends along a cross direction of the web 3. The slot die 20 and the back-up roll 10 are pressed against each other with a footprint having an engagement depth D and a machine-direction width W as shown in FIGS. 2B-C.

A coating material 7 is provided to the internal manifold 24, flows through the slot channel 23, and is dispensed from the opening 25. The die lip 22 of the slot die 20 provides a coating surface (e.g., a surface of the upstream die lip portion 22a, and/or a surface of the downstream die lip portion 22b) that is engaged with flexible web 3 wrapped around the back-up roll 10. When the coating material 7 is dispensed from the slot die 20 onto the flexible web 3, a liquid layer (coating bead) 92 is present between the coating surface of the slot die 20 and the flexible web 3.

In the embodiment of FIG. 2A, the slot die 20 is pressed against the back-up roll 10 such that the coating surface of the slot die 20 at least partially surpasses the un-deformed surface 201 of the back-up roll 10. In the embodiment of FIG. 2B, the slot die 20 is pressed against the back-up roll 10 and there is a gap between the coating surface of the slot die 20 and the un-deformed surface 201 of the back-up roll 10.

In the depicted embodiments, the die lip 22 provides an upstream coating surface at 22a and a downstream coating surface at 22b, separated by the opening 25, through which one or more coating liquids are applied to the flexible web 3. The die lip 22 is typically in contact with the coating liquid and can take on various shapes. For example, the die lip can be concave or convex relative to the back-up roll (or may have sections which are concave and sections which are convex to the back-up roll). The radius of curvature may be 0.01 mm, 0.1 mm, 1 mm, 10 mm, 100 mm, or any other suitable number. The radius of curvature may also be infinite, indicating that the die lip is approximately straight. The die lip will have a length both upstream and downstream from the opening(s), and this length may be about 0.01 mm, 0.1 mm, 0.25 mm, 0.5 mm, 1 mm, 5 mm, or any other suitable number. The die opening may include one or more channels through which the coating fluid can flow towards the back-up roll, where the one or more channels are arranged in the machine direction (for example, the slot dies described in chapter 4 of Jaewook Nam, Analysis of Tensioned-Web-over-Slot Die Coating, PhD Thesis, 2009, University of Minnesota) or in the cross-web direction (for example, the slot dies described in U.S. Pat. No. 7,846,504). The width of the die opening may be, for example, 0.05 mm, 0.1 mm, 0.25 mm, or any other suitable number. In some embodiments, the die slot may also be angled relative to a radial projection of the back-up roll, with this angle being about 0 degrees, 2 degrees, 5 degrees, or 10 degrees, and with either positive or negative angles both being acceptable. It is to be understood that various configurations of slot die can be applied herein. Exemplary slot dies are described in, for example, Ian D. Gates, Slot Coating Flows: Feasibility, Quality, PhD Thesis, 1999, University of Minnesota.

The die coating processes described herein are referred to as pre-metered coating processes. In some embodiments, the coating apparatuses described herein can further include a pump and a control system for the pump. The pump can provide a predetermined flow rate of the fluid coating material into the internal manifold 24. The predetermined flow rate, along with other factors such as, for example, the web speed, can largely define the thickness of the coating layer. The pump can be, for example, a high bandwidth precision pump that is in fluid communication with an input port of the die body. The pump is configured to supply the coating material 7 into the internal manifold 24 at an adjustable flow rate such that the coating material 7 can be dispensed onto the moving web 3 through the die lip 22 to form a coating 9 with a desired thickness. In some embodiments, the coating thickness can be controlled in a range, for example, about 1 to about 500 micrometers.

The coating material 7 can be any coatable material including, for example, water- or solvent-based solutions, radiation curable solutions primers, adhesives, inks, dispersions, emulsions, etc. The coating material may be Newtonian or non-Newtonian. In some embodiments, the coating solution may have a shear-sensitive viscosity or may shear thin and have a viscosity below about 100,000 centipoise (cPs), optionally below about 1,000 cPs. For example, a typical fluid may have a viscosity of about 10,000 cPs at a shear rate of 10 l/s and a viscosity of about 3,000 cPs at a shear rate of 2,000 l/s. The wet coating on the web can be dried, cured, or solidified to form a coating layer on the web. A uniform coating 9 is formed on the surface 31 of the web 3 that faces the slot die 20. A wet coating thickness refers to the coated thickness on the web immediately after the slot die. After drying, curing, or solidification, the coating thickness can be reduced. That reduction of coating thickness is due to a loss of volatile materials during drying, and/or shrinkage of the polymer. Curing can be accomplished by, for example, exposure of the coating to elevated temperature, or actinic radiation. Actinic radiation can be, for example, in the UV spectrum.

The back-up roll 10 has a deformable inner layer 12 with a surface thereof covered by an outer layer 14. The inner and outer layers 12, 14 may be permanently bonded together in some embodiments and may not be permanently bonded together in other embodiments. It is to be understood that the "outer layer" does not necessarily mean an outermost layer; and the "inner layer" does not necessarily mean an innermost layer. The outer layer 14 has a substantially uniform thickness about the periphery of the inner layer 12. The deformable inner layer 12 is mounted onto a rigid central core 11 (e.g., a metal core, a fiberglass core, a fiberglass shell mounted on a metal core, etc.) with a substantially uniform thickness about the periphery of the rigid central core 11. In some embodiments, the thickness ratio between the deformable inner layer 12 and the outer layer 14 can be about 3:1 or greater, about 5:1 or greater, about 7:1 or greater, or about 10:1 or greater. In some embodiments, the outer layer 14 has a thickness in the range from about 0.005" to about 0.300", optionally from about 0.005" to about 0.120". As used herein, 1" equals to 2.54 cm. In some embodiments, the deformable inner layer 12 has a thickness in the range from about 0.125" to about 3", optionally from about 0.4" to about 1.0". In some embodiments, compressible rollers described in U.S. Pat. No. 5,206,992 can be used to make the back-up roll herein.

In some embodiments, the material used for the inner layer 12 can be softer than the material used for the outer layer 14. That is, an identical compressive force applied to an identically sized block of each material can result in a larger deformation in the direction of applied force with the softer material than with the harder material. This softness may be provided in several ways, for example by choosing a material with a lower hardness (as indicated using any appropriate hardness scale, such as Shore A or Shore OO), by choosing a material with a lower elastic modulus, by choosing a material with a higher compressibility (typically quantified via a material's Poisson's ratio), or by modifying the structure of the softer material to contain a plurality of gas inclusions, such as a foam or an engraved structure, etc. For example, when the outer layer 14 includes a material having a hardness of 60 Shore A (as measured using ASTM D2240), then the hardness of the inner layer 12 may be less than 60 Shore A. It should be noted that in some cases the hardness may be most appropriately measured using different scales for the inner and outer layers (e.g., Shore A durometer for the outer layer and Shore OO for the inner layer). In some embodiments, the compressibility of the inner layer 12 may be measured via Compression Force Deflection Testing per ASTM D3574 when the inner layer is foam; and via Compression-Deflection Testing per ASTM D1056 when the inner layer is a flexible cellular material such as, for example, sponge or expandable rubber. The inner layer 12 may have a compressibility of less than about 45 psi at 25% deflection, optionally less than about 20 psi at 25% deflection.

In some embodiments, the outer layer 14 can be made of material(s) that are substantially incompressible, e.g., the relative volume change of the material in response to a contact pressure is less than 5%, less than 2%, less than 1%, less than 0.5%, or less than 0.2%. The inner layer 12 is configured to be elastically deformable, e.g., being capable of substantially 100% (e.g., 99% or more, 99.5% or more, or 99.9% or more) recovering to its original state after being deformed. In some embodiments, the inner layer 12 can be compressible to provide the desired deformability. In some embodiments, the inner layer 12 may be substantially incompressible, but sufficiently soft to provide the desired deformability. In some embodiments, the inner layer 12 may be a layer made of substantially incompressible material which has been patterned, 3D printed, embossed, or engraved to provide the desired deformability.

In some embodiments, the hardness of the deformable outer layer 14 can be greater than about 40 Shore A, optionally greater than about 50 Shore A. In some embodiments, the hardness of the deformable inner layer 12 can be less than about 20 Shore A, optionally less than about 10 Shore A. In some embodiments, the inner layer 12 may have a higher compressibility than the outer layer 14. In some embodiments, the outer layer 14 can have a Poisson's ratio greater than about 0.1, greater than about 0.2, greater than about 0.3, or preferably greater than about 0.4. In some embodiments, the deformable inner layer 12 can have a Poisson's ratio less than about 0.5, less than about 0.4, less than about 0.3, or preferably less than about 0.2. In some embodiments, the deformable inner layer 12 can have a negative Poisson's ratio.

In some embodiments, the deformable outer layer 14 can include one or more materials of an elastomer, a metal, a fabric, or a nonwoven. In some embodiments, the outer layer 14 can be a substantially incompressible elastomer having a hardness greater than about 40 Shore A, or optionally greater than about 50 Shore A. The thickness of the outer layer 14 of the back-up roll 10 can be less than about 10 mm, less than about 5 mm, or less than about 2 mm. Suitable elastomers may include thermoset elastomers such as, for example, Nitriles, fluoroelastomers, chloroprenes, epichlorohydrins, silicones, urethanes, polyacrylates, EPDM (ethylene propylene diene monomer) rubbers, SBR (styrene-butadiene rubber), butyl rubbers, nylon, polystyrene, polyethylene, polypropylene, polyester, polyurethane, etc.

In some embodiments, the deformable inner layer 12 can include one or more materials of a foam, an engraved, structured, 3D printed, or embossed elastomer, a fabric or nonwoven layer, or a soft rubber. The inner layer 12 of the back-up roll 10 can have a hardness less than about 20 Shore A, or less than about 10 Shore A. A suitable foam can be open-celled or closed-celled, including, for example, synthetic or natural foams, thermoformed foams, polyurethanes, polyesters, polyethers, filled or grafted polyethers, viscoelastic foams, melamine foam, polyethylenes, cross-linked polyethylenes, polypropylenes, silicone, ionomeric foams, etc. The inner layer may also include foamed elastomers or vulcanized rubbers, including, for example, isoprene, neoprene, polybutadiene, polyisoprene, polychloroprene, nitrile rubbers, polyvinyl chloride and nitrile rubber, ethylene-propylene copolymers such as EPDM (ethylene propylene diene monomer), and butyl rubber (e.g., isobutylene-isoprene copolymer). A suitable foam inner layer 12 of the back-up roll 10 can have a compressibility, for example, less than about 45 psi at 25% deflection, or less than about 20 psi at 25% deflection. It is to be understood that the inner layer 12 may include any suitable compressible structures such as, for example, springs, nonwovens, fabrics, air bladders, etc. In some embodiments, the inner layer 12 can be 3D printed to provide desired Poisson's ratio, compressibility, and elastic response.

Referring again to FIGS. 1 and 2A/B, the flexible web 3 is conveyed along a web path and fed into the coating zone 120. The back-up roll 10 can rotate about an axis thereof to transport the web 3 along the machine direction 5 and through the coating zone 120. The back-up roll 10 can be rotated using a motor, or can be rotated simply due to frictional contact with the flexible web 3.

The flexible web 3 can include any suitable flexible substrate, such as, for example, a polymer web, a paper, a polymer-coated paper, a release liner, an adhesive coated web, a metal coated web, a flexible glass or ceramic web, a nonwoven, a fabric, or any combinations thereof. The flexible web 3 is disposed between the back-up roll 10 and the slot die 20, wrapping around the back-up roll 10 with various wrap angles. In some embodiments, the flexible web 3 can wrap the back-up roll 10 with a wrap angle in the range, for example, from about 1 to about 180 degrees, about 1 to about 120 degrees, about 1 to about 90 degrees, or about 1 to about 60 degrees.

In some embodiments, the flexible web 3 may exhibit distortions or non-flatness characteristics when it is conveyed along the web path as a baggy web. The non-flatness characteristics may include, for example, lanes, strips, bumps, ripples, etc. FIG. 1' illustrates exemplary non-flatness characteristics 43' on the baggy web 3', which can be located on any portions of the web (e.g., center or edge). In the free-span coating of FIG. 1', the surface portions of the web 3' having such non-flatness characteristics 43' may result in variations (e.g., coating defects 44' over the non-flatness characteristics 43') in coat weight across the baggy web 3' that is conveyed along the machine direction 5'. The methods and apparatuses described herein can significantly mitigate the variations induced by the non-flatness characteristics of a baggy web.

As shown in FIGS. 2A-C, the slot die 20 is pressed against the back-up roll 10 to form the coating zone 120, where the flexible web 3 at a contacting area 15 is impressed into a deformable surface of the back-up roll 10 with an engagement width W along the machine direction 5 and an engagement depth D. The deformation of the backup roll is due to the pressure that builds between the slot die 20 and the flexible web 3 such that the backup roll 10 deflects to the engagement depth D in the contacting area. In some embodiments, the machine-direction engagement width W may be in a range, for example, from about 0.1 mm to about 50 mm. In some embodiments, the engagement depth D can be within a range, for example, from about 0.01 mm to about 10 mm, from about 0.05 mm to about 5 mm, or from about 0.1 mm to about 1 mm. It is to be understood that the contacting area 15 may not be limited to the area or space between the back-up roll 10 and the slot die 20 (i.e. there may be some distance after the slot die 20 in the machine direction before which the back-up roll 10 recovers to its original shape). A contacting area might refer to an area where the surface of the back-up roll 10 is deformed upon the engagement with the slot die.

In some embodiments, the back-up roll 10 may not be perfectly cylindrical, with a departure from cylindricity quantified using a total indicated runout (TIR), which can be defined as the difference between the largest and smallest values of the radius on the roll. For example, a roll with a maximum radius of 150.100 mm in one location, and a minimum radius of 150.000 mm in another location, would have a TIR of 0.100 mm. When the back-up roll engages a slot die and rotates, the nonuniformities in roll radius may translate through the coating bead formed between the back-up roll and the slot die. The differences in radius can produce a difference in pressure within a coating (e.g., in a liquid phase), resulting in a nonuniform coating. The impact of this TIR can be diminished by increasing the softness of the back-up roll (thereby making it easier to deform under fluid or mechanical pressure), though it is well known in industry that soft materials can be more difficult to machine into precise shapes. One of the benefits of the present disclosure is that the thin, outer layer 14 can present a harder surface, and so is more practical to machine, without sacrificing the overall softness of the back-up roll construction. In some embodiments, the TIR of the back-up roll 10 may be, for example, no greater than about 100 micrometers, or no greater than about 50 micrometers.

Referring again to FIG. 2A/B, the portion of flexible web 3 at the contacting area 15 is impressed, via the slot die 20, into the face of the back-up roll 10 with the engagement depth D. The slot die 20 can apply a uniform pressure at the contacting area 15 across the web. The flexible web 3 can spread evenly along the cross-web direction over the face of the back-up roll 10. A non-baggy surface of the flexible web 3 can be formed when the web goes through the coating zone 120. As shown in FIG. 2C, the non-flatness characteristics 43 are significantly reduced in the web 3 on the wrapping area around the back-up roll 10. The coating material 7 is applied to form an even coating 9 on the non-baggy surface of the web 3 that contacts the slot die 20. The non-flatness characteristics 43 on the baggy web may restore after the flexible web 3 leaves the contact with the back-up roll 10, which may not affect the uniformity of the coating already formed on the web.

The coating 9 can have a substantially uniform thickness across the surface of the flexible web 3. In addition, when the web 3 is conveyed through the coating zone 120 by, e.g., rotating the back-up roll 10, the back-up roll 10 has sufficiently low total indicated runout (TIR, e.g., less than 100 micrometer, preferably less than 50 micrometer), which helps to maintain a uniform force to create uniform coating along the down-web direction.

In some embodiments, the engagement depth D between the slot die 20 and the back-up roll 10 can be adjusted. The engagement depth D can be adjusted to be within a range, for example, from about 0.01 mm to about 10 mm, from about 0.05 mm to about 10 mm, or from about 0.1 mm to about 5 mm. In some embodiments, the engagement depth D can be adjusted by positioning the slot die 20 and/or the back-up roll 10. The relative position of the slot die 20 and the back-up roll 10 can be adjusted using a mounting and positioning mechanism. The engagement depth D can be adjusted by positioning the slot die 20 and/or the back-up roll 10 such that the die lip of the slot die 20 intersects the curved plane defined by the surface of the back-up roll 10 in its un-deformed state. It should be understood that the engagement depth D (defined as the displacement of the outer surface of the back-up roll from its undeformed state) may be increased by the presence of the coating liquid and may not be set solely by the position of the die.

In some embodiments, as the back-up roll is rotated, and variations in the surface uniformity (TIR) and mechanical properties of the back-up roll may lead to variations in force in the coating bead. As the engagement depth D is increased, these variations in force may become small relative to the overall force experienced by the coating bead. This may lead to improvements in coating uniformity and stable coating operating windows, where the variance in the coating weight/thickness over the surface of the flexible web can be, for example, less than about 10%, less than about 5%, less than about 2%, less than about 1%, or less than about 0.5%. It is to be noted that this is despite the back-up roll having a TIR that is significant compared to the wet coating thickness. For example, the ratio of the TIR to the wet coating thickness may be up to 300%, up to 100%, up to 50%, or up to 25%.

In some embodiments, the engagement depth D can be controlled to be less than a critical value to avoid defects such as lateral (i.e., cross-web direction) spreading of a coating liquid, or web tension issues which may be caused by a large engagement depth D.

Not wanting to be bound by theory, the range of engagement depth D that produce an acceptable coating window (e.g., enough engagement to minimize the impact of TIR and material property variation of the back-up roll, but not so much to produce noticeable coating defects such as lateral spreading) is a complex function of the viscosity vs. shear behavior of the coating liquid, the mechanical deformation behavior of the back-up roll, and the geometry of the coating die. For example, when the viscosity of the coating liquid in the coating bead is too low and the modulus of the back-up roll is too high, the coating liquid may not be able to support enough pressure in the coating bead against the back-up roll to increase the engagement depth D, and the back-up roll may behave in a manner similar to a rigid back-up roll, and so the effect of TIR may be large. It is to be noted, then, that in the contacting area 15, there needs to be a balance of the viscous force developed by the coating liquid (at the relevant shear rate in the coating process) to the elastic force developed by the back-up roll at a given engagement depth D to observe a successful coating window.

It is useful to provide a quantitative description of the qualities of the back-up roll covering that confer the unexpected performance advantages of this disclosure. For example, it has been found that solid rubber covers, even those having a very low modulus, may not perform as well as dual layer covers having a thin solid rubber outer layer over a compressible inner layer. Furthermore, even dual layer covers having a very thin compressible inner layer may not confer the desired coating uniformity over the entire length of the back-up roll. For example, U.S. Pat. No. 6,079,352 describes a roll with an inner compressible layer thickness between "about 0.3175 cm and about 1.27 cm" and often "about 0.635 cm" with an outer layer thickness between "about 0.0127 and about 0.1524 cm". As shown in the example section below, a back-up roll D1, which has a compressible inner layer thickness of 0.404 cm and an outer layer thickness of 0.152 cm that fall within the ranges specified by U.S. Pat. No. 6,079,352, failed to confer desired coating uniformity over the entire length of the back-up roll.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Examples of Back-Up Roll

Quantitative roll covering characterization was conducted on a selection of back-up rolls 10 described in Table 1 below. The back-up rolls have various roll-cover configurations mounted on a rigid core. The back-up rolls labeled R1, R2, D1, D2, and D3 were used for mechanical testing. Diameters for the Test Roller and the Test Plate are provided for reference. The foam inner layers of rolls D1, D2, and D3 and a separate roll (not listed in Table 1) with only a single foam layer and no outer rubber layer were all constructed of the same material, a closed-cell polyurethane foam provided by American Roller Company, with varying thicknesses. Roller R1 was commercially available from Finzer Roller, Des Plaines, Ill. Rollers R2, D1, D2 and D3 were commercially available from American Roller Company, Union Grove, Wis.

Test Methods

The following test methods have been used in evaluating some of the Examples of the present disclosure.

Shore A Hardness Measurements

The Shore A hardness measurement of the rubber layers in Table 1 was measured, on the ASTM D2240 type A scale, using a Model 306L durometer tester manufactured by Pacific Transducer Corporation of Los Angeles, Calif. The hardness values in the table are an average of individual hardness measurements obtained from three cross-web locations at three positions around the circumference of each roller. It is understood that the hardness measurement mainly reflects the material properties of the outer rubber layer of the roller, though it may also be affected by the properties of the underlying foam layer.

Shore OO Hardness Measurements

Using the same procedure described above, the hardness of the separate foam roller without an outer rubber layer was measured to be 35 on the ASTM D2240 type 00 scale, using a Model 1600 durometer tester with a MS-OO indenter manufactured by Rex Gauge Company of Buffalo Grove, Ill. It was not possible to measure the hardness of the foam layers in rollers D1, D2 and D3 of Table 1 because of the presence of the outer rubber layer. As rollers D1, D2, D3 and the separate foam roller were all manufactured by American Roller Company, using the same manufacturing process, it is assumed that the hardness of the foam layers in rollers D1, D2 and D3 is similar to that of foam roller, namely 35 on the OO durometer scale.

Modulus Measurements

The Young's modulus values in Table 1 were obtained from the measured hardness values using a formula presented in a paper by J. K. Good, "Modeling Rubber Covered Nip Rollers in Web Lines", Proceedings of the Sixth International Conference on Web Handling, Oklahoma State University, 2001.

Mechanical Compression Testing

Figure 3B:
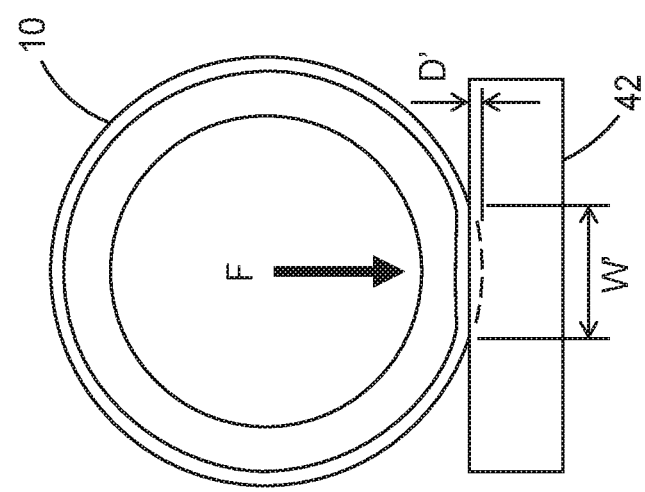
FIG. 3B is a schematic diagram of a back-up roll engaged with a test plate for mechanical compression testing.
Figure 3A:
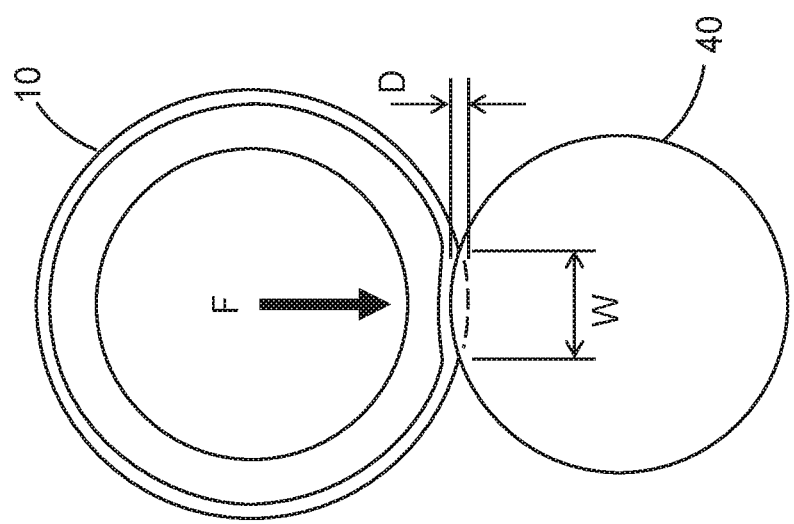
FIG. 3A is a schematic diagram of a back-up roll engaged with a test roller for mechanical compression testing.

Mechanical compression testing using a mechanical testing machine, such as those manufactured by Instron Corporation, is well understood by those versed in the art. Referring to FIGS. 3A and 3B, rolls, labeled 10 in the figures and designated R1, R2, D1, D2, and D3 in Table 1, were first pressed into a Test Roller 40 having an outside diameter of 90 mm as shown in FIG. 3A and second into a Test Plate 42, corresponding to a flat plate having an essentially infinite outside diameter as shown in FIG. 3B in an Instron (Model 5500R) universal mechanical testing machine. The mechanical testing machine engaged each roller over a range of engagement depths D or D' and widths W or W' at a constant speed of about 83.8 micrometers per second. The engage-

TABLE 1

| Roller Name | Diameter | | Rubber Layer | | | Foam | S-Factor | |
| --- | --- | --- | --- | --- | --- | --- | --- | --- |
| | Outside (mm) | Core (mm) | Thickness (mm) | Hardness (Shore A) | Modulus (MPa) | Thickness (mm) | Average ($10^6 \cdot N/m^{5/2}$) | Slope ($10^6 \cdot N/m^{7/2}$) |
| R1 - Medium rubber | 120 | 95 | 12.7 | 60 | 4.27 | — | 31.0 | 61233 |
| R2 - Soft rubber | 120 | 100 | 10.1 | 20 | 0.45 | — | 6.3 | 8868 |
| D1 - Dual layer thin | 110 | 99 | 1.52 | 60 | 4.27 | 4.04 | 21.6 | 11517 |
| D2 - Dual layer medium | 120 | 100 | 2.54 | 55 | 3.21 | 7.54 | 5.4 | 34 |
| D3 - Dual layer thick | 165 | 127 | 1.65 | 49 | 2.26 | 17.3 | 2.7 | −102 |
| Test Roller | 90 | | | | | | | |
| Test Plate | ∞ | | | | | | | | ment depth and the contact force between the back-up roll 10 and the Test Roller 40 or Test Plate 42 were measured and recorded using the Instron's frame position sensor and force load cell. The force versus engagement curve was then plotted for each test. Two such representative force versus engagement curves for the back-up roll D2 are shown in FIG. 4.

Figure 4:
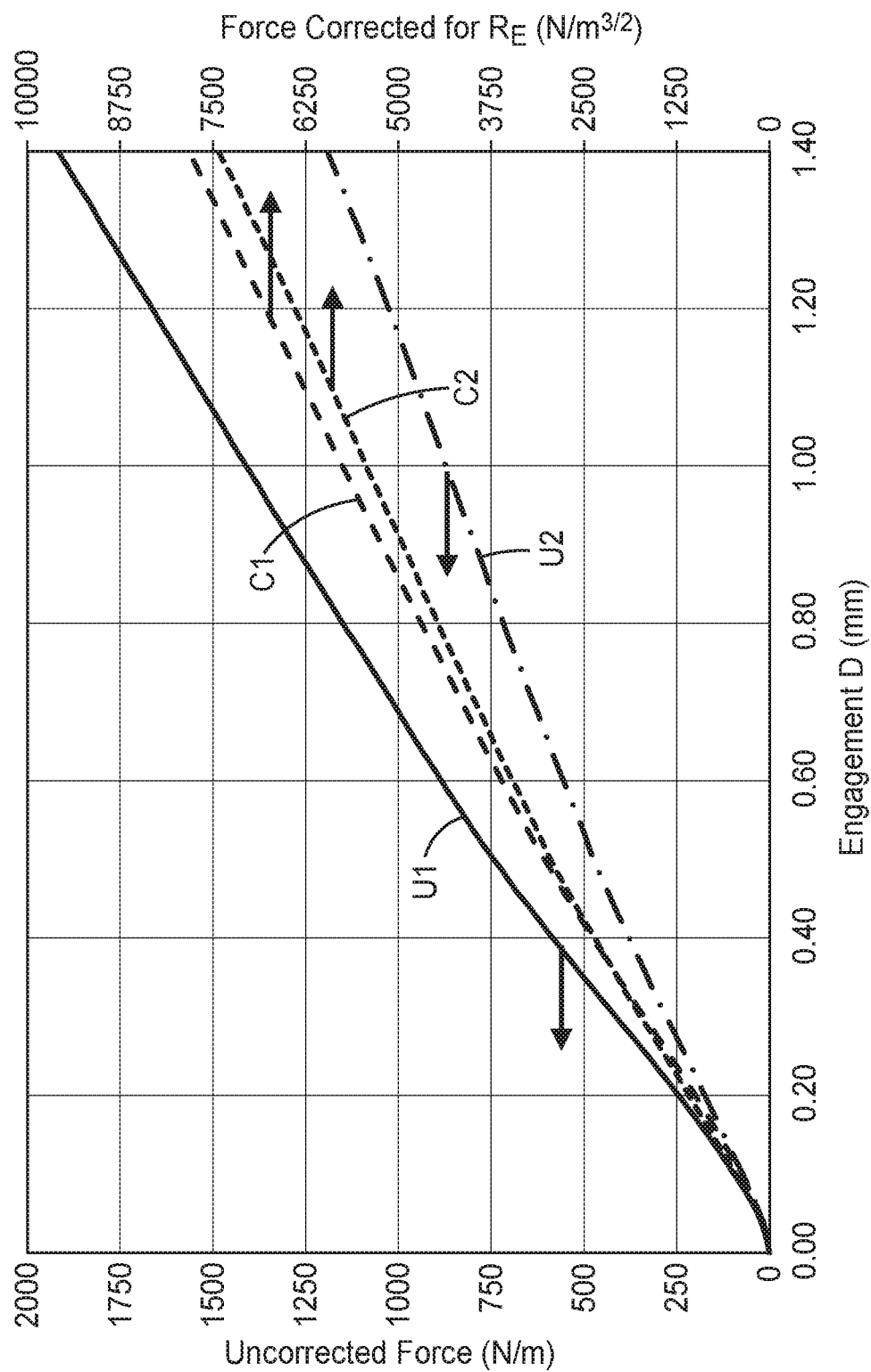
FIG. 4 illustrates force versus engagement curves for the mechanical compression testing in FIGS. 3A-B.

Referring to FIG. 4, data U2 represents the force vs. engagement curve for the roller D2 in Table 1 engaged with the Test Roller 40 of FIG. 3A, while U1 represents the curve for the roller D2 engaged with a flat surface Test Plate 42 of FIG. 3B. As can be appreciated from FIGS. 3A and 3B, engaging the roller D2 with the Test Plate requires the displacement and or compression of more cover material, and therefore more force F, than a comparable level of engagement of D2 with Test Roll. Correspondingly the force vs. engagement curve U1 rises more steeply than curve U2. As neither the Test Plate or Test Roller necessarily represent the condition of engaging a die lip of arbitrary diameter into roller D2, well established principles in the field of contact mechanics may be used to generate force vs. engagement data that are independent of the geometry used for mechanical testing, as described in the S-Factor determination.

S-Factor Determination

A formula was derived for the force F required to engage a roller having a cover with a deformable layer by a distance D into a rigid roller or flat surface. See Formulas 5.74 and 5.70 in Contact Mechanics; K. L. Johnson; Cambridge University Press 1985; Lib. of Congress catalog: 84-11346, which are valid for a deformable roller with a single deformable layer.

$$W = 2\left(\frac{3 \cdot F \cdot (1-v^2) \cdot (1-2 \cdot v) \cdot R_E \cdot b}{E \cdot (1-v)^2}\right)^{1/3} \quad [1]$$

$$D = \frac{W^2}{8 \cdot R_E} \quad [2]$$

where W is contact width, F represents the applied force, normalized to a unit length of roller contact, $v$ is Poisson's ratio, b is the cover layer thickness, and E is elastic modulus of the cover layer of the roller, D is the engagement of the deformable cover into a rigid roller or surface, and $R_E$ is the effective radius given by $$R_E = \frac{D_1 \cdot D_2}{2 \cdot (D_1 + D_2)} \quad [3]$$

where $D_1$ and $D_2$ representing the diameters of the two rollers or surfaces in contact with each other, and a flat plate corresponding to an essentially infinite roller diameter (i.e., a flat plate can be treated as a roller with an infinite diameter).

Substituting Equation [1] into Equation [2] gives $$F = K \cdot D^{3/2} \cdot \sqrt{R_E} \quad [4]$$

$$K = \frac{2\sqrt{2} \cdot E \cdot (1-v)^2}{3 \cdot (1-v^2) \cdot (1-2v) \cdot b} \quad [5]$$

Equations [4] and [5] were derived for rollers with a single deformable layer. For the more general case of multi-layer rollers it may be possible to derive analogous equations, though in this case the exponent on the engagement D may no longer be 3/2, and the variable K may now be a function of the engagement D. Additionally, the variable K may represent the compressibility factor characterizing the elastic modulus, Poisson's ratio, and thicknesses of all layers present I the deformable cover.

The data represented by curves U1 and U2 in FIG. 4 may be rendered into a geometrically invariant form by correcting for the geometry of the fixture used to obtain the data, namely Test Roller, 40 in FIG. 3A or Test Plate, 42, in FIG. 3B. Using the relationship between F and $R_E$ in Equation [4], geometry corrected data C1 in FIG. 4 were obtained by dividing data U1 by the square root of $R_{E-Flat}$, equal to 60.1 mm and calculated using Equation [3], for engaging the roller D2 into the Test Plate. A similar geometric correction was applied to obtain data C2 from U2 in FIG. 4 by dividing by the square root of $R_{E-Roll}$, equal to 25.8 mm, for engaging the roller D2 into the Test Roller. To within a small experimental error, the curves C1 and C2 in FIG. 4 are equal. This shows the corrected force vs. engagement data in C1 and C2 are in fact geometrically invariant, or in other words are not dependent on the original geometric differences between the Test Roller and the Test Plate used to obtain the uncorrected compression test data U1 and U2.

To obtain force vs. engagement data from C1 and C2 for an application, for example engaging a die lip into roller D1 from Table 1, the previously corrected force data can be multiplied by the square root of $R_E$ that is appropriate for the application geometry. Using this procedure, the geometrically invariant data can be recast into a form that is appropriate for the application. It should be noted that this geometric correction procedure, transforming force vs. engagement data obtained from a compression testing apparatus to a geometrically invariant form and then transforming it again for modeling a contacting surface of a die lip is valid only if the parameter K in Equation [4] is held substantially constant. For the purposes of this application K is considered constant, even for back-up rolls having different diameters, if the roller covers are constructed in an equivalent manner, having the same layers, made of similar materials with the same layer thicknesses.

An experimentally obtained parameter, S-Factor, may be obtained for any roller system by dividing the geometrically corrected force vs. engagement data C1 or C2, based on FIG. 4, by the roller engagement D, for each data point.

$$S = \frac{F}{D \cdot \sqrt{R_E}} \quad [6]$$

In the case of a roller composed of a single deformable layer, Equations [4] and [5] can be used to estimate the S-factor directly:

$$S = \frac{2\sqrt{2} \cdot E \cdot (1-v)^2}{3 \cdot (1-v^2) \cdot (1-2 \cdot v) \cdot b} \cdot \sqrt{D} \quad [7]$$

For natural and synthetic rubbers, the Young's modulus can be determined using the following expression between Shore A (i.e., IRHD) hardness and modulus presented in a paper by J. K. Good, "Modeling Rubber Covered Nip Rollers in Web Lines", Proceedings of the Sixth International Conference on Web Handling, Oklahoma State University, Stillwater, Okla., 2001, pp 159-177.

$$E = 0.145 e^{0.0564 \cdot IRHD} \text{ (MPa)} \quad [8]$$

The calculation in Equation [6] is carried out individually for each data pair $(F_i, D_i)$ obtained from the mechanical compression test described previously. In addition, for rollers R1 and R2 in Table 1, which have single rubber covers, using a Poison's ratio of 0.47 for the rubber covers, the S-Factor is calculated from Equation [7] for the same experimental engagement ranges for these rollers. The S-Factor is related to the slope of the corrected force data C1 and C2 in FIG. 4, having the same units of measure, namely $N/m^{5/2}$. It should be noted that this S-Factor is not a true local slope because it depends on the magnitude of the corrected force datum $F_i$ and total engagement value D, used to obtain that force.

Figure 5:
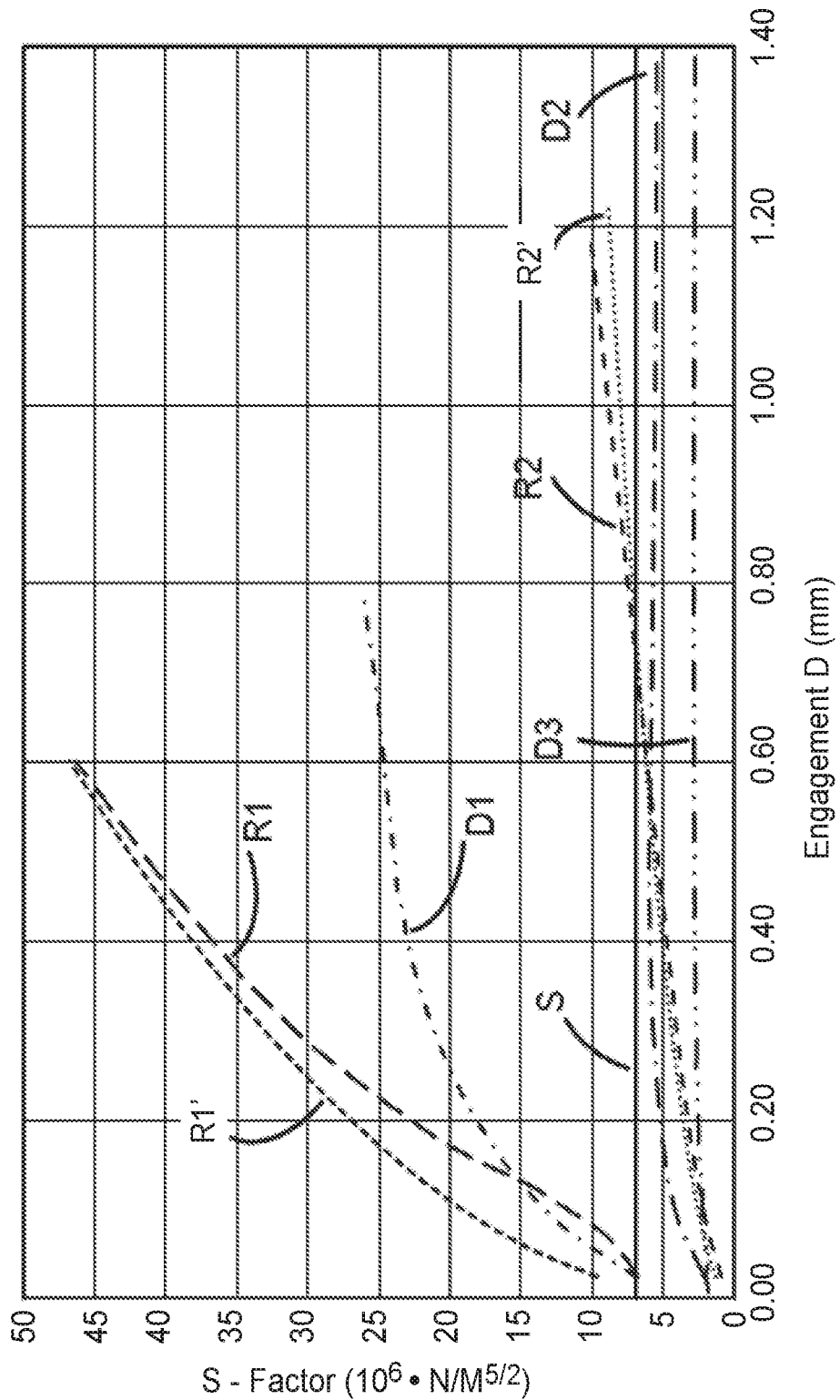
FIG. 5 illustrates plots of slope factor S versus engagement depth D for various back-up rolls.

S-Factors calculated for rollers R1, R2, D1, D2 and D3 in Table 1 are shown as a function of roller engagement D in FIG. 5. As indicated, for rollers R1 and R2 the S-Factor curves calculated from the experimental force-engagement data sets showed good agreement with the S-Factor curves determined from closed form Equation [6] (indicated by R1' and R2'). S-Factors quantitatively describe intrinsic design properties of the roller covers in Table 1 and are governed by the thickness, modulus, Poisson's ratio or compressibility of the various layers covering the rigid core of the back-up roll. Because of the aforementioned geometric correction procedure for experimentally obtained force data, S-Factors do not depend on the lengths or diameters of the Test Roller 40 in FIG. 3A or Test Plate 42 in FIG. 3B. Likewise, when used to calculate cross-web engagement D and contact pressure F, S-Factors do not depend on the lengths or diameters of a die lip or back-up roll in contact with each other.

Referring to FIG. 5, rollers R1, R2, D1, D2 and D3 have qualitative and quantitative differences in S-Factor as a function of engagement depth D. Both rollers R1 and R2, having a single layer solid rubber cover and roller D1 having a solid rubber outer layer over a thin compressible inner layer have S-Factors that increase monotonically with engagement D. Rollers R1, D2 and D3 have S-Factors that are substantially smaller in magnitude to rollers D1 and R2. Quantitatively, S factors averaged over a range of engagement D from 0 mm to 1 mm are tabulated in Table 1 along with the slope of the S-Factor for engagements D greater than 0.2 mm. It is to be understood that in some embodiments, the S factors can be averaged over a range of engagement D from 0.05 mm to 1 mm without significantly changing the result. It is important to note that there may be an upper engagement limit for some back-up roll constructions. For example, a compressible inner layer may be engaged to such an extent that the force begins to rise quickly with further engagement. When calculating the slope of the S-Factor it is understood that the range of engagement values used falls below an upper engagement limit wherein a compressible inner layer has been compressed beyond its design limit. The average S-Factor was calculated by averaging S-Factor data pairs (Si, D) for all engagement values $D_i$ between 0 mm and 1 mm. The S-Factor slope was calculated by fitting a line to the S-Factor data pairs (Si, D) for engagement values $D_i$ between 0.2 mm and 2 mm using the least squares method.

The S-Factor may be directly related to the uniformity of engagement D and contact force over the entire width in the cross-web direction of a slot die coating system. Consistent engagement pressure has been noted as a key element to obtaining uniform coating over the entire width of the web. A resilient back-up roll cover, having a low and consistent force response to changes in engagement D, can tolerate greater roller TIR or substrate thickness variation with minimal or no change to coating thickness or quality. In fact, a sufficiently resilient back-up roll cover can tolerate process upsets such as baggy web or splices with minor effect on coating quality. Such a resilient back-up roll cover can have an S-Factor, averaged over a range of engagement D from about 0 to 1.0 mm, or from 0.05 to 1.0 mm, that is less than 15 $(10^6 \cdot N/m^{5/2})$ and preferably less than 10 $(10^6 \cdot N/m^{5/2})$. Furthermore, a resilient back-up roll cover can have a slope in the S-Factor vs. engagement curve, for engagement values greater than 0.2 mm, that is less than 5000 $(10^6 \cdot N/m^{7/2})$, preferably less than 500 $(10^6 \cdot N/m^{7/2})$ and most preferably less than 50 $(10^6 \cdot N/m^{7/2})$.

Coating Examples

A web of 30.5 cm (12") PET was prepared with a 5.08 cm (2") wide baggy lane in the center (the level of bag was approximately 1%). A die with downstream land length of 0.53 cm (0.21") and convex radius of 24.5 cm (9.625") was used to coat an adhesive solution with a viscosity at 10 l/s of roughly 8 Pa·s and a viscosity at 2,000 l/s of roughly 3 Pa·s onto the prepared baggy web, using roll 1 from table 1 as a backup roll.

TABLE 1

| Roll | Materials | | Outer diameters (in) | | | Shore A Durometer |
|------|-----------|-----------|-----------|-----------|-----------|-----------|
| | Inner layer | Outer layer | Steel core | Inner layer | Outer layer | |
| 1 | Urethane foam | Urethane rubber Continuous, non-porous | 3.937 | 4.524 | 4.724 | 50 |
| 2 | Silicone rubber | N/A | 3.937 | 4.724 | N/A | 20 |

Condition 1

The apparatus described in the previous section was used to produce coatings at a wet thickness of approximately 6.8 mils and a line speed of 0.381 meters per second (75 FPM). The web tension was set to 12 lbs, or 1 lb/linear inch (PLI) with this 30.5 cm (12") wide film. The die was positioned in the free span (see e.g., FIG. 1'), with the downstream edge of the die located about 1" below the center line of the backup roll. The die was engaged into the path of the web by approximately 50 mils, thereby deforming the web in an attempt to produce a uniform coating. The coating was continuous on either side of the baggy lane in the web, but was discontinuous and consisted of large bubbles in the baggy center lane. This would be considered a defective coating.

Condition 2

Using the same setup as condition 1, the die was engaged a further 50 mils (to a total of 100 mils) without any improvement in coating quality in the baggy lane.

Condition 3

Using the same setup as condition 2, the force on the web was increased to 24 lbs (2 PLI) without any improvement in coating quality in the baggy lane.

Condition 4

The coating setup and conditions from the previous examples were reused, with the exception that the die was now positioned such that the downstream edge of the lip was located along the centerline of the roll. The gap between the roll and the die was set to 10 mils using steel shims, after which the die was engaged into the roll by 30 mils. In this case a uniform coating was obtained across the web, including in the baggy center lane.

Condition 5

Using the same setup as condition 4, the force on the web was reduced to 12 lbs (1 PLI) without any degradation in the coating quality observed in condition 4.

Condition 6

The coating setup from condition 5 was used, but with roll 2 replacing roll 1. In this case the coating was generally uniform in the baggy center lane. However, significant additional defects were observed that coincided with defects due to nonuniformities in the rubber layer of roll 8.

Table 2 below summarizes Conditions 1-6.

TABLE 2

| Condition | Web Tension (pli) | Engagement Depth (mils) | Line speed m/s (fpm) | Wet Thickness (mils) | Uniform coating | Die Position | Backup Roll |
|---|---|---|---|---|---|---|---|
| 1 | 1 | 50 | 0.38 (75) | 6.8 | No | Free span | N/A |
| 2 | 1 | 100 | 0.38 (75) | 6.8 | No | Free span | N/A |
| 3 | 2 | 100 | 0.38 (75) | 6.8 | No | Free span | N/A |
| 4 | 2 | 30 | 0.38 (75) | 6.8 | Yes | On Roll | 1 |
| 5 | 1 | 30 | 0.38 (75) | 6.8 | Yes | On Roll | 1 |
| 6 | 1 | 30 | 0.38 (75) | 6.8 | No | On Roll | 2 |

Examples of Impact of Skin Thickness on Coating Quality

Two foam rolls were prepared as back-up rolls for coating. Roller F1 had only a single foam layer constructed of a closed-cell polyurethane foam provided by American Roller Company, with no outer layer. Roller F1 was commercially available from American Roller Company, Union Grove, Wis. Roller F2 was composed of a pourable water blown flexible foam commercially available from Smooth-On, Macungie, Pa., under a trade designation FlexFoam-iT VIII Pillow Soft. The foam was cast between a 3" diameter stainless-steel roller and a 5" diameter cylindrical mold mounted concentrically with the roller. The foam was used as-is after being unmolded and had a natural skin which formed during the foam casting process.

Shore OO Hardness Measurements

The Shore OO hardness values of rollers F1 and F2 were measured by following ASTM D2240, using a Model 1600 durometer tester with a MS-OO indenter manufactured by Rex Gauge Company of Buffalo Grove, Ill. The hardness value of roller F1 was found to be 35 shore OO. The hardness value of roller F2 was low enough that it did not register on the durometer tester and so was assigned a value of 0 shore OO. These hardness values are an average of individual hardness measurements obtained from three cross-web locations at three positions around the circumference of each roller.

Coating Conditions

A web of 30.5 cm (12") wide, 1.8 mil (0.0457 mm) thick PET was prepared for coating. A die with a downstream land length of 0.53 cm (0.21") and convex radius of 24.45 cm (9.625") was positioned so that the 1.8-mil (0.0457 mm) PET was between the die and the foam roller. Web tension was held constant at 1 pli, and all run conditions were at a line speed of 0.127 meters per second (25 fpm). Adhesive was fed to the die via a gear pump at a rate to achieve a 16-mil (0.731 mm) wet coating thickness target. The conditions run can be found in Table 3 below. During coating the die was impressed into the roll to find the best coating condition and coating quality which was evaluated visually. During Conditions 3-6, once coating was established strips of stainless steel shim stock (approximately 8" wide and 3 ft long, and commercially available from Precision Brand Products Inc., Downers Grove, Ill.) were passed through the coating zone on the back side of the web between the PET and the foam roller.

Both rollers F1 and F2 provided clearly nonuniform coatings when used as-is. Roller F2 provided increasingly more uniform coatings when the stainless-steel shims of increasing thickness were passed through the coating zone. Coating onto roller F2 covered by a shim with a thickness of 2 mils (Condition 4) provided clearly improved coating quality over coatings obtained with rollers F1 and F2 alone, as well as coatings obtained with roller F2 and a 1 mil (0.0254 mm) thick shim. Coating onto roller F2 covered by a shim with a thickness of 3 mils or greater (conditions 5 and 6) provided an even greater improvement in coating quality.

TABLE 3

Coating conditions demonstrating impact of skin thickness on coating quality (+ = poor, ++ = moderate, +++ = good)

| Condition | Foam Roll | Core Diameter cm (in) | Outer Diameter cm (in) | Foam Thickness cm (in) | Shim Thickness (mils) | Coating Quality |
|---|---|---|---|---|---|---|
| 1 | F1 | 10.0 (3.937) | 11.61 (4.570) | 1.00 (0.3937) | N/A | + |
| 2 | F2 | 7.37 (2.900) | 14.15 (5.570) | 3.39 (1.335) | N/A | + |
| 3 | F2 | 7.37 (2.900) | 14.15 (5.571) | 3.39 (1.335) | 1.000 | + |
| 4 | F2 | 7.37 (2.900) | 14.15 (5.572) | 3.39 (1.335) | 2.000 | ++ |

TABLE 3-continued

Coating conditions demonstrating impact of skin thickness
on coating quality (+ = poor, ++ = moderate, +++ = good)

| Condition | Foam Roll | Core Diameter cm (in) | Outer Diameter cm (in) | Foam Thickness cm (in) | Shim Thickness (mils) | Coating Quality |
|---|---|---|---|---|---|---|
| 5 | F2 | 7.37 (2.900) | 14.16 (5.573) | 3.39 (1.335) | 3.000 | +++ |
| 6 | F2 | 7.37 (2.900) | 14.16 (5.575) | 3.39 (1.335) | 5.000 | +++ |

LISTING OF EXEMPLARY EMBODIMENTS

Exemplary embodiments are listed below. It is to be understood that any one of the embodiments 1-11 and 12-19 can be combined.

Embodiment 1 is a method of applying a coating onto a web, the method comprising:
  providing a back-up roll having a deformable inner layer with a surface thereof covered by a deformable outer layer, the inner layer being softer than the outer layer;
  providing a slot die having one or more die lips extending along a cross direction, the one or more die lips being positioned proximate to the back-up roll;
  disposing a flexible web between the back-up roll and the one or more die lips;
  dispensing a liquid coating material from the slot die onto the flexible web,
  wherein the flexible web at a contacting area is impressed into the back-up roll with an engagement depth D.

Embodiment 2 is the method of embodiment 1, further comprising adjusting the engagement depth D in a range from about one micrometer to about 2 mm.

Embodiment 3 is the method of embodiment 1 or 2, further comprising metering a liquid flow through the slot die to control a wet thickness of the coating.

Embodiment 4 is the method of embodiment 3, wherein the wet thickness of the coating is adjusted to be within the range of about 1 to about 500 micrometers.

Embodiment 5 is the method of any one of embodiments 1-4, further comprising pressing the slot die against the back-up roll.

Embodiment 6 is the method of any one of embodiments 1-5, wherein the flexible web has one or more surface non-flatness characteristics.

Embodiment 7 is the method of embodiment 6, wherein the flexible web is a baggy web.

Embodiment 8 is the method of embodiment 6 or 7, wherein the one or more surface non-flatness characteristics includes a splice, a web thickness variation, or a web wrinkle.

Embodiment 9 is the method of any one of embodiments 1-8, further comprising wrapping the flexible web around the back-up roll.

Embodiment 10 is the method of any one of embodiments 1-9, wherein the back-up roll has an S-Factor, averaged over a range of the engagement D from about 0.05 mm to about 1 mm, optionally being less than about 15 ($10^6 \cdot N/m^{5/2}$), or less than about 10 ($10^6 \cdot N/m^{5/2}$).

Embodiment 11 is the method of any one of embodiments 1-10, wherein the liquid coating material has a viscosity lower than about 10,000 centipoise (cps).

Embodiment 12 is a coating apparatus comprising:
  a back-up roll having a deformable inner layer with a surface thereof covered by a deformable outer layer, the inner layer being softer than the outer layer;
  a slot die having one or more die lips extending along a cross direction, the one or more die lips being positioned proximate to the back-up roll; and
  a flexible web disposed between the back-up roll and the slot die,
  wherein the flexible web at a contacting area is impressed into the back-up roll with an engagement depth D, and the slot die is configured to dispense a liquid coating material onto the web.

Embodiment 13 is the coating apparatus of embodiment 12, wherein the deformable inner layer of the back-up roll has a hardness less than 20 Shore A, optionally less than 10 Shore A.

Embodiment 14 is the coating apparatus of embodiment 12 or 13, wherein the inner layer of the back-up roll has a compressibility of less than about 45 psi at 25% deflection, optionally less than about 20 psi at 25% deflection.

Embodiment 15 is the coating apparatus of any one of embodiments 12-14, wherein the deformable outer layer of the back-up roll has a hardness greater than about 40 Shore A, optionally greater than about 50 Shore A.

Embodiment 16 is the coating apparatus of any one of embodiments 12-15, wherein the deformable outer layer includes one or more materials of an elastomer, a metal, a fabric, or a nonwoven.

Embodiment 17 is the coating apparatus of any one of embodiments 12-16, wherein the deformable inner layer includes one or more materials of a synthetic foam, an engraved, structured, 3D printed, or embossed elastomer, a fabric or nonwoven layer, a plurality of cavities filled with gas of a controlled pressure, or a soft rubber.

Embodiment 18 is the coating apparatus of any one of embodiments 12-17, wherein the back-up roll has an S-Factor, averaged over a range of the engagement D from about 0.05 mm to about 1 mm, optionally being less than about 10 ($10^6 \cdot N/m^{5/2}$), or less than about 5 ($10^6 \cdot N/m^{5/2}$).

Embodiment 19 is the coating apparatus of any one of embodiments 12-18, wherein the liquid coating material has a viscosity lower than about 10,000 centipoise (cps).

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method of applying a coating onto a web, the method comprising:
    positioning a slot die having one or more die lips extending along a cross direction proximate to a back-up roll having a deformable inner layer with a surface thereof covered by a deformable outer layer, the inner layer being softer than the outer layer;
    disposing a flexible web between the back-up roll and the one or more die lips;
    dispensing a liquid coating material from the slot die onto the flexible web;
    wherein the slot die is positioned proximate to the back-up roll such that the pressure of the liquid coating material between the slot die and the flexible web impresses the flexible web at a contacting area into the back-up roll with an engagement depth D wherein adjusting the engagement depth D in a range from about one micrometer to about 2 mm.

2. The method of claim 1, further comprising metering a liquid flow through the slot die to control a wet thickness of the coating.

3. The method of claim 2, wherein the wet thickness of the coating is adjusted to be within the range of about 1 to about 500 micrometers.

4. The method of claim 1, wherein the flexible web has one or more surface non-flatness characteristics.

5. The method of claim 4, wherein the flexible web is a baggy web.

6. The method of claim 4, wherein the one or more surface non-flatness characteristics includes a splice, a web thickness variation, or a web wrinkle.

7. The method of claim 1, wherein the flexible web is wrapped around the back-up roll where the liquid coating material is dispensed from the slot die onto the flexible web.

8. The method of claim 1, wherein the back-up roll has an S-Factor measured against a rigid flat plate, averaged over a range of the engagement D from about 0.05 mm to about 1 mm, being less than about 15 ($10^6 \cdot N/m^{5/2}$), wherein $$S = \frac{F}{D \cdot \sqrt{R_E}}$$

and F is force, D is the engagement depth, and RE=0.5.

9. The coating method of claim 1, wherein the liquid coating material has a viscosity lower than about 10,000 centipoise (cps).

10. The coating method of claim 1, wherein the deformable outer layer has a hardness greater than about 40 Shore A.

11. The coating method of claim 1, wherein the deformable inner layer has a hardness less than about 20 Shore A.

* * * * *